United States Patent
Muhrer et al.

(10) Patent No.: US 6,404,083 B1
(45) Date of Patent: Jun. 11, 2002

(54) PLUG PART FOR MAKING CONTACT WITH WIRES OF STATOR WINDINGS OF AN ELECTRIC MOTOR

(75) Inventors: Robert Muhrer; Hansjorg Sand, both of Spielberg (AT)

(73) Assignee: ATB Austria Antriebstechnik Aktiengesellschaft, Spielberg (AT)

( * ) Notice: Subject to any disclaimer, the term of this patent is extended or adjusted under 35 U.S.C. 154(b) by 29 days.

(21) Appl. No.: 09/598,832

(22) Filed: Jun. 21, 2000

(30) Foreign Application Priority Data

Jun. 22, 1999 (AT) .............................................. 1100/99

(51) Int. Cl.[7] .............................................. H02K 3/50
(52) U.S. Cl. ...................................................... 310/71
(58) Field of Search ........................................... 310/71

(56) References Cited

U.S. PATENT DOCUMENTS

| | | | | |
|---|---|---|---|---|
| 4,215,464 A | * | 8/1980 | Miller | 29/598 |
| 4,476,407 A | | 10/1984 | Hildebrandt et al. | 310/71 |
| 4,656,378 A | * | 4/1987 | Atherton et al. | 310/71 |
| 5,175,458 A | | 12/1992 | Lemmer et al. | 310/71 |

FOREIGN PATENT DOCUMENTS

| | | | | |
|---|---|---|---|---|
| CH | 669073 A5 | 2/1989 | | |
| EP | 0029328 A1 | 5/1981 | | |
| EP | 0107025 A1 | 5/1984 | | |
| EP | 0484313 B1 | 5/1992 | | |
| EP | 0484313 A2 | 5/1992 | | |
| JP | 54-148203 | * | 11/1979 | 310/71 |
| JP | 3-112335 | * | 5/1991 | 310/71 |

* cited by examiner

Primary Examiner—Karl Tamai
(74) Attorney, Agent, or Firm—Young & Thompson

(57) ABSTRACT

A plug part (1) for making contact with the wires of the stator windings of electric motors has a foot part (2) which using projecting tines (21) and a projection (22) can be fixed on adjacent slot insulations. The plug part (1) furthermore has a receptacle mount (3) which is a component which is separate from the foot part (2) and which can be detachably fixed with a swivelling capacity on the foot part (2). The receptacle mount (3) consists of a bottom part (4) with receivers (40) for the receptacles and of a top part (5) which can be folded for closing the receivers (40) for the receptacles onto the bottom part (4) of the receptacle mount (3) and can be fixed by locking. The foot part (2) of the plug part (1) can first of all be attached without the receptacle mount (3) to a stator before the winding heads are formed and sewn. Only then is the receptacle mount (3) attached to the foot part (2). The receptacles are crimped directly onto the enamelled wires of the stator windings and are fitted into the receivers (40) in the receptacle mount (3).

20 Claims, 5 Drawing Sheets

PLUG PART FOR MAKING CONTACT WITH WIRES OF STATOR WINDINGS OF AN ELECTRIC MOTOR

BACKGROUND OF THE INVENTION

The invention relates to a plug part for making contact with the wires of stator windings of an electric motor.

The plug which is described in CH 669 073 A is not fixed on the winding of a stator, but slipped onto the guide web of the motor flange and consists of a bottom part and a cover. There is no separate receptacle mount, therefore a component which is separate from the foot part which is fixed on the stator, in CH 669 073 A.

The connection device which is described in EP 0 107 025 A consists of a plug housing with a bottom part and a top part, the bottom part with dovetail guide parts being pushed into grooves on the outer periphery of a laminated stator core before the end bracket is applied. The bottom part of the plug housing held on the laminated core in EP 0 107 025 A has alignment forks in which the coil ends are held and then guided to plug pins which are located in the bottom part. It is important that in EP 0 107 025 A the alignment forks are used solely to accommodate the stator winding ends, but not for fixing the plug part on the motor, since this takes place using guide parts which are inserted into the grooves in the stator core.

A plug part for making contact with the wires of stator windings of an electric motor with the features of the introductory part of claim 1 is known from EP 0 484 313 B. This known plug part is a one-piece, plastic injection molding which has a foot which has two projecting tines which adjoin the sides of the slot insulations facing away from one another, and one projection which is located between the two tines, and which fits between adjacent slot insulations. In the plug part contacts are used to which (enamelled) wires which form the stator windings are directly connected to be electrically conductive.

The plug part which is known from EP 0 484 313 B has worked well, but problems often arise with fixing the plug part using its foot on the slot insulations of the stator winding when the winding heads have already been formed and sewn.

Another disadvantage in the plug part which is known from EP 0 484 313 B consists in that the electrically conductive connection of the winding wires of the electric motor is not easily possible with the contacts in the plug part, since the receivers for the receptacles to which the winding wires must be connected electrically conductively are poorly accessible.

SUMMARY OF THE INVENTION

The object of the invention is to devise a plug part of the initially mentioned type with a foot part which can be attached even before forming and sewing of the winding heads of the stator windings of an electric motor and in which contact can be established with the winding wires more easily than in the past.

Since the plug part as claimed in the invention is in two parts and has a foot part and a receptacle mount which can be fixed to the latter and which for its part consists of a bottom part and a top part which can be fixed on the bottom part, it is possible first of all to fix only the foot part of the plug part as claimed in the invention on the stator, then to form and sew the winding heads. Afterwards the receptacle part is connected to the foot part. Finally the enamelled wires which form the stator winding are connected electrically conductively to the receptacles, the receptacles are fixed in the receptacle mount and then the receptacle mount is closed by its top part.

In one preferred embodiment the receptacle mount can be swivelled relative to the foot part by roughly 90° so that the receptacle mount can be swivelled out of the position projecting to the outside from the stator, i.e. the position in which the receptacles are inserted in it, into a position which is aligned parallel to the axis of the stator core.

BRIEF DESCRIPTION OF THE DRAWINGS

Other features, details and advantages of the plug part as claimed in the invention result from the following description of one preferred embodiment of the invention using the drawings.

DESCRIPTION OF THE PREFERRED EMBODIMENTS

Figure 1:
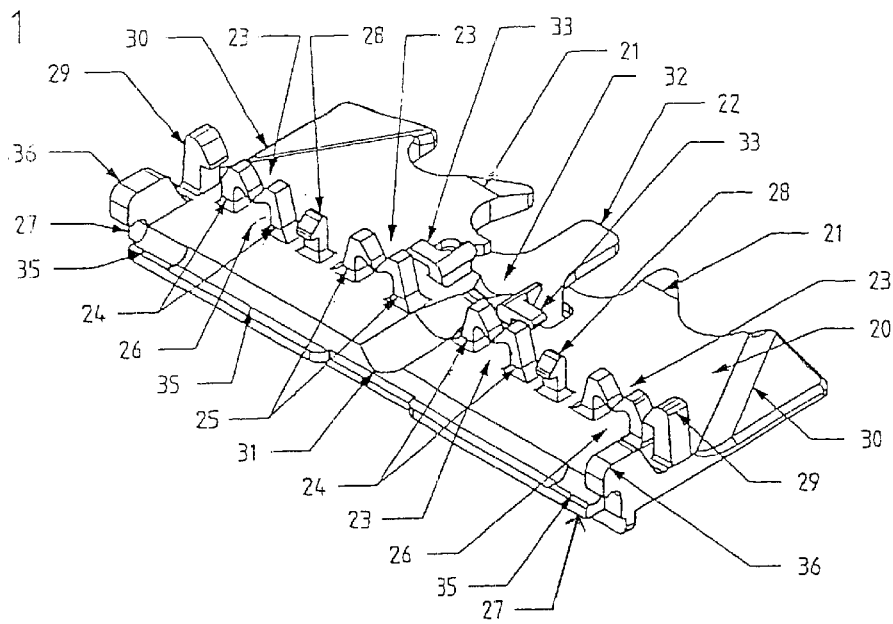
FIG. 1 shows in an oblique view the foot part of the plug part.

The plug part 1 as claimed in the invention consists of a foot part 2 and a receptacle mount 3 which consists of a bottom part 4 and a top part 5.

The foot part 2 has a base plate 20. The base plate 20 on one lengthwise edge has two tines 21 and between them a projection 22 which can be attached to adjacent insulation of a stator winding (which is not shown) by frictional engagement and form-fit, the slot insulation being held between the tines 21 and the projection 22.

Figure 2:
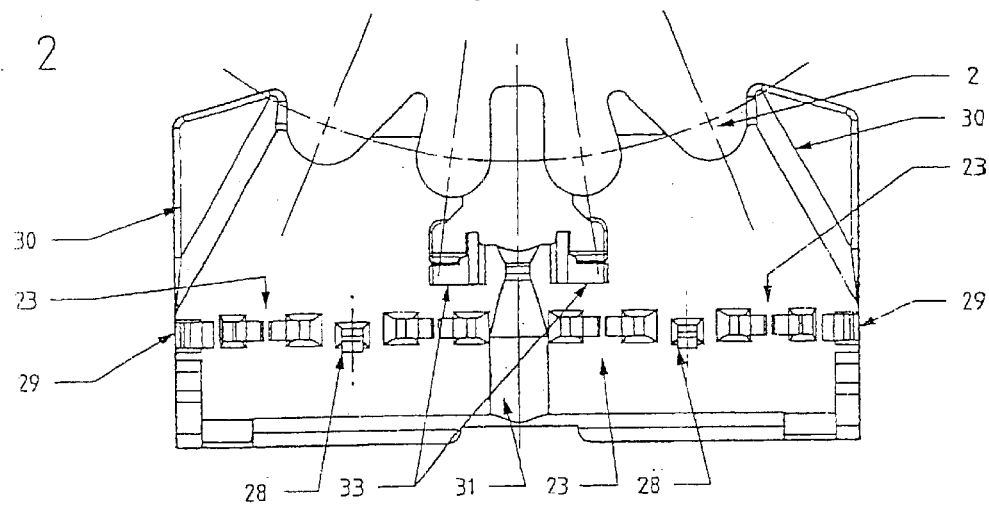
FIG. 2 shows an overhead view of the foot part from FIG. 1.

Pairs 23 of hooks with two hooks 24 each project from the top of the foot part 2 which is visible in FIGS. 1 and 2. The ends 25 of the hooks 24 are closely adjacent to one another so that wires which are to be routed to the receptacles and which are to be connected electrically conductively to them, for example the enamelled wires of the stator windings, can be pressed down from overhead between the hooks 24 into the underlying receiving space 26. The ends 25 of the hooks 24 preferably have a distance from one another which is somewhat smaller than the diameter of the enamelled wires which form the stator windings. Thus they can be easily pressed into the receiving spaces 26 which are bordered by the hooks 24.

This is especially advantageous, since the receptacles can already be fixed beforehand, for example, by crimping on the ends of the wires.

As FIGS. 1 and 2 show, in the embodiment on the foot part 2 there are a total of four pairs 23 of hooks 24.

On the edge of the base plate 20 of the foot part 2, i.e. the edge opposite the tines 21 and the projection 22, there are bearings 27 which consist of bearing halves 35 and 36. In bearings 27 bearing journals 60 are accommodated for swivelling support of the receptacle mount 3.

Figure 6:
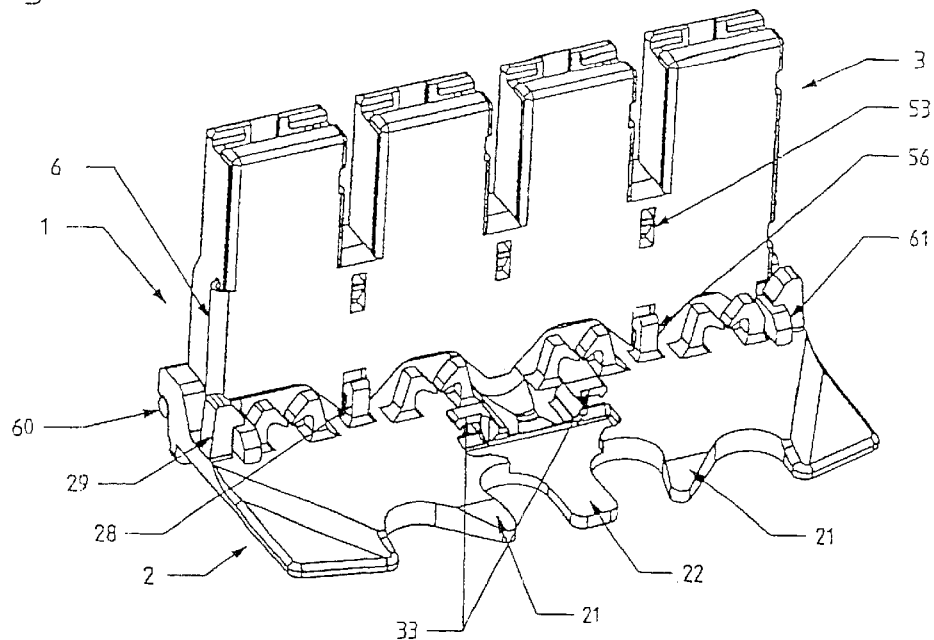
FIG. 6 shows the plug part in an oblique view with a closed receptacle mount attached to the foot part, FIG. 7 in an oblique view shows a stator lamination with the foot part attached in an oblique view.
Figure 9:
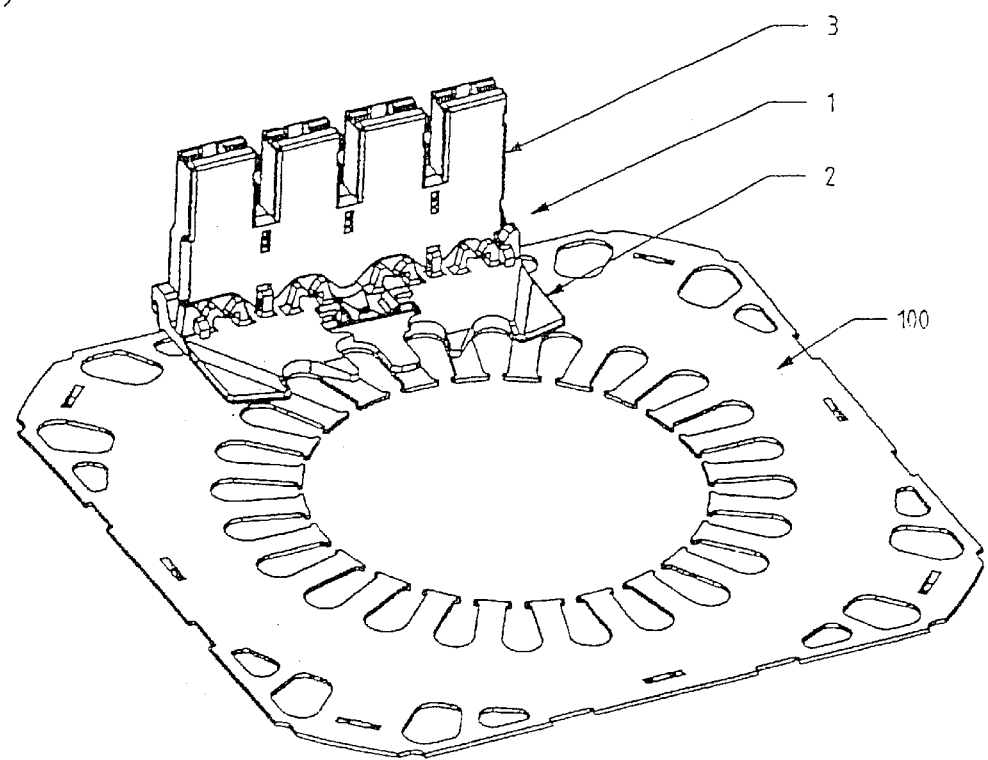

Furthermore, on the foot part 2 there are catch hooks 28 projecting from its top which fit into catch recesses 56 in the receptacle mount 3, after it has been fixed on the foot part 2 and has been swivelled relative to it for example by 90° into the position which is shown in FIGS. 6 and 9.

There are other catch hooks 29 in the area of the side edges of the base plate 20 of the foot part 2 which lock with the catch tongues 61 of the receptacle mount 3 when it has been swivelled into the position as shown in FIG. 6 or 9.

In the area of the two side edges and in the middle of the base plate 20 of the foot part 2 there are recesses 30 and 31. These recesses 30 and 31 are designed not to hinder the motions of needle(s) with which the winding heads of the stator windings are sewn, even if the foot part 2 (compare FIG. 7) has already been attached to the stator by snapping onto adjacent slot insulations.

In the top of the base plate 20 of the foot part 2 a recess 32 is relieved; in its area there are two tongues 33 which have a distance from the base plate 20 and which extend parallel to the base plate 20 of the base part 2 away from one another. This recess 32 and the tongues 33 are designed to accommodate and secure the wire when a circuit, for example the wiring of a capacitor, are to be held in the plug part 1, especially in its foot part 2.

Even if the bearings 27 in FIG. 1 are made such that the lower bearing halves 35 end within the upper bearing halves 36 which project from the top of the base plate 20 of the foot part 2, an embodiment is conceivable in which the lower bearing halves 35 extend as far as the side edges of the base plate 20 of the foot part 2, therefore end opposite the upper bearing halves 35.

Figure 4:
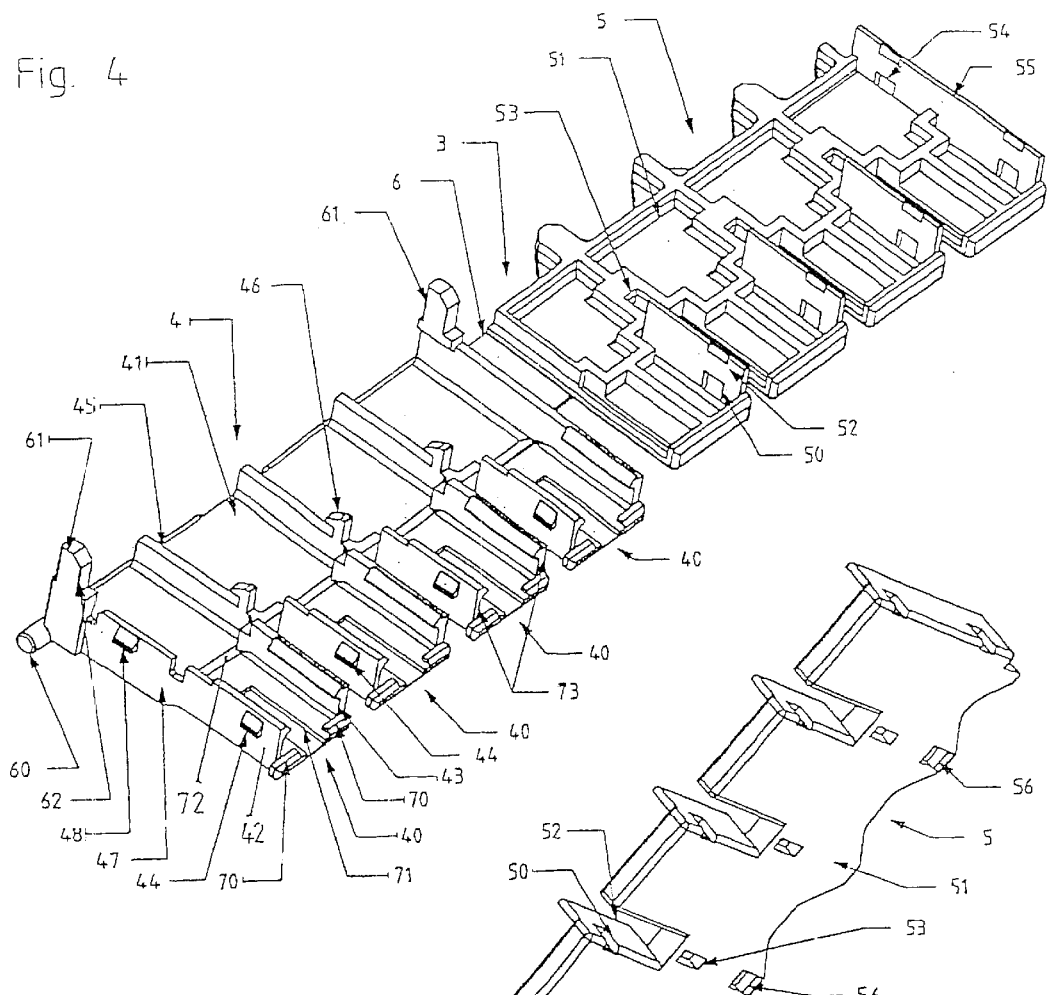
FIG. 4 shows the receptacle mount in an oblique view in the folded-up state.
Figure 5:
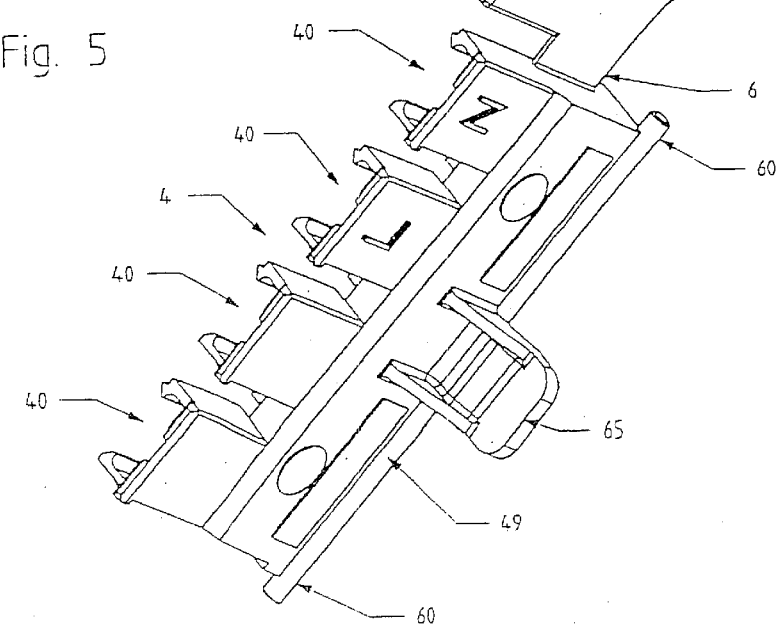
FIG. 5 shows the receptacle mount in the folded-up state viewed from underneath.

The receptacle mount 3 which is shown in FIGS. 4 and 5 consists of a bottom part 4 and a top part 5. In this embodiment the top part 5 is connected to the bottom part 4 via a film hinge 6. Thus the top part 5 can be folded down onto the bottom part 4 by swivelling and the receptacle mount 3 can be closed after receptacles have been fixed in it.

In one modified embodiment the top part 5 can be a component which is separate from the bottom part 4 of the receptacle mount 3 and which is seated on the bottom part 4 in the manner of a cover and is locked for example to it.

In this embodiment of the receptacle mount 3, in the bottom part 4 of the receptacle mount 3 corresponding to the four hook pairs 23 on the foot part 2 of the plug 1 there are four receiving spaces 40 for the receptacles (not shown). Each receiving space 40 is bordered on both sides by walls 42 and 43 which project upward from the base plate 41 of the bottom part 4 of the receptacle mount 3. The walls 42 on their outside each bear a catch projection 44 which fit into catch recesses 50 with the receptacle mount 3 closed. The catch recesses 50 are relieved in the walls 52 which project from the cover plate 51 of the top part 5.

To fix the top part 5 of the receptacle mount 1 reliably in the bottom part 4, between the walls 42, 43 of the receiving spaces 40 for the receptacles, i.e. the walls adjacent to one another, there are catch hooks 46 on the walls 45 which project from the base plate 41 of the bottom part 4. The catch hooks 46 fit into catch recesses 53 in the cover plate 51 of the top part 5 when the top part 5 is folded onto the bottom part 4 of the receptacle mount 3.

Finally, there is a catch projection 48 on the wall 47 which faces away from the film hinge 6 which hinges the bottom part 4 to the top part 5 of the receptacle mount 3. The catch projection 48 fits into a catch recess 54 on the side wall 55 of the top part 5 of the receptacle mount 3 when the receptacle mount 1 is closed.

On one edge of the base plate 41 of the bottom part 4 of the receptacle mount 3, specifically the edge assigned to the foot part 2, there is a bead 49 which with the formation of the bearing journal 60 projects over the sides of the bottom part 4 of the receptacle mount 1. Using the bead 49 and the two bearing journals 60 the receptacle mount 3 can be fixed with a swivelling capacity in the bearings 27 of the foot part 2. Preferably the dimensioning of the bead 49 and the bearing journals 60 on the receptacle mount 3 on the one hand and that of the bearings 27 on the foot part 2 on the other are chosen such that the receptacle mount 3 can be inserted by simply snapping the journal 60 and the bead 49 into the bearings 27 on the foot part 2. If, as in the embodiment, the lower bearing half 35 on the foot part 2 is made essentially continuous over the entire length of the foot part 2, with unhindered swivelling capacity of the receptacle mount 3 an especially secure seat of the receptacle mount 3 on the foot part 2 is ensured.

When the receptacle mount 3 which has been attached to the foot part 2 and which can be swivelled relative to it has been swivelled into the position shown in FIGS. 6 and 9, on the one hand the catch hooks 29 which are provided on the side edges of the foot part 2 fit via the catch tongues 61 of the receptacle mount 3 and on the other the catch hooks 28 of the foot part 2 which are located between the two pairs 23 of hooks fit into the catch recesses 56 in the top part 5 of the receptacle mount 3. Thus, not only the position of use of the plug part 1 as claimed in the invention which is shown in FIG. 6—the receptacle mount 3 includes with the foot part 2 an angle of 90°—is ensured, but the closed position of the receptacle mount 3—the top part 5 of the receptacle mount 3 folded onto the bottom part 4—is secured by catch hooks 28 since they have locked into the catch recesses 56.

To improve the seat of the plug part 1 as claimed in the invention on the stator of an electric motor, on the bottom of the base plate 20 of the foot part 2 there can be a rib 37 which runs lengthwise, with two pairs of projections 38 which point in the direction of the tines 21.

To secure the seat of the plug part 1 in the axial direction, in the embodiment which is shown in the drawings (see FIG. 5) on the outside of the bottom part 4 of the receptacle mount 3 there is a claw 65 which is supported on one component of the electric motor, especially on a corresponding projection of an end bracket. Thus the seat of the plug part 1 on the electric motor is ensured even when plugs inserted into the receptacles must be removed one time for some reason.

The receiving spaces 40 for the receptacles in the bottom part 4 of the receptacle mount 3 are bordered to the front by two ribs 70 which leave an open space. In the base plate 41 of the bottom part 4 of the receptacle mount 3 in the middle of each receiving space 40 there is a recess 71 in which the spring tongues of the receptacles can catch. Thus receptacles can be pushed into the receiving spaces 40 from the left as viewed in FIG. 4 until the receptacle with its front end adjoins the ribs 70, at the same time the spring of the receptacle adjoining the inner end 72 of the recess 71. The receptacles are prevented from slipping out of the receiving spaces 40 to the top by retaining ribs 73. In the embodiment which is shown in FIG. 4 these retaining ribs 73 are bevelled to the top so that the receptacles can also be pressed into the receiving spaces 40 from overhead. This allows especially simple installation and simple insertion of the receptacles into the receiving spaces 40, since first of all a loop in the enamelled wire of the stator winding need not be formed.

The receiving spaces 40 in the receptacle mount 3 are used to hold receptacles for making contact with the main phase winding, the auxiliary phase winding and if necessary a capacitor.

It is advantageous for the receptacles when using the plug part 1 as claimed in the invention to be able to be attached to the winding wires directly without the interposition of stranded conductors. In this way the complex crimping of stranded conductors to the enamelled wires of the stator windings is eliminated.

Figure 7:
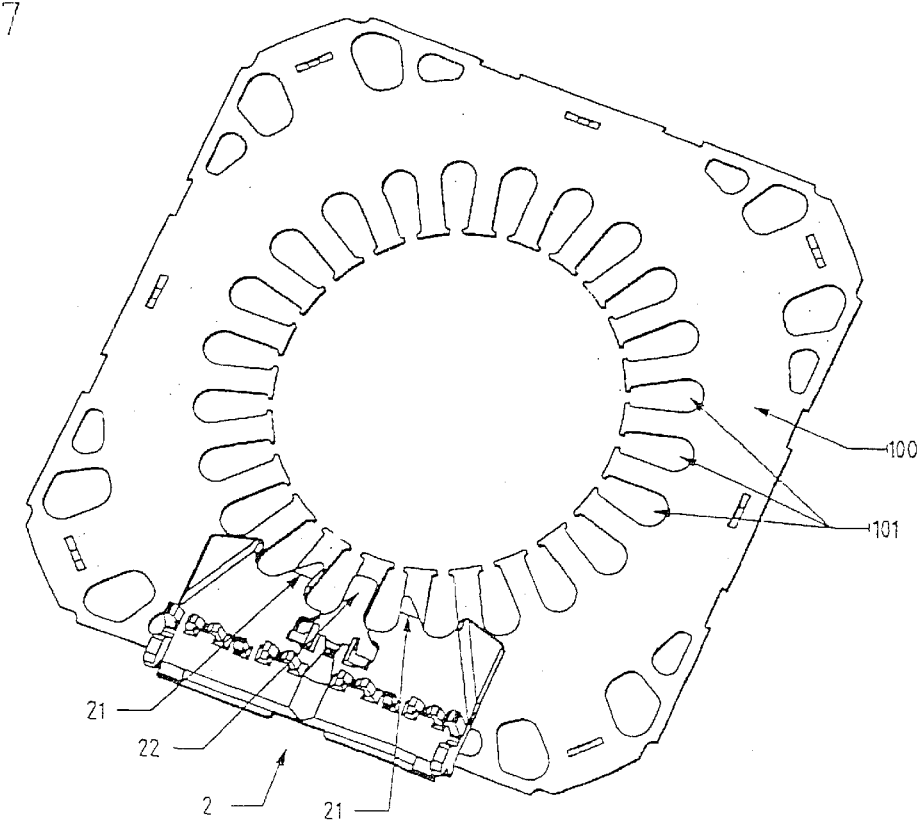
Figure 8:
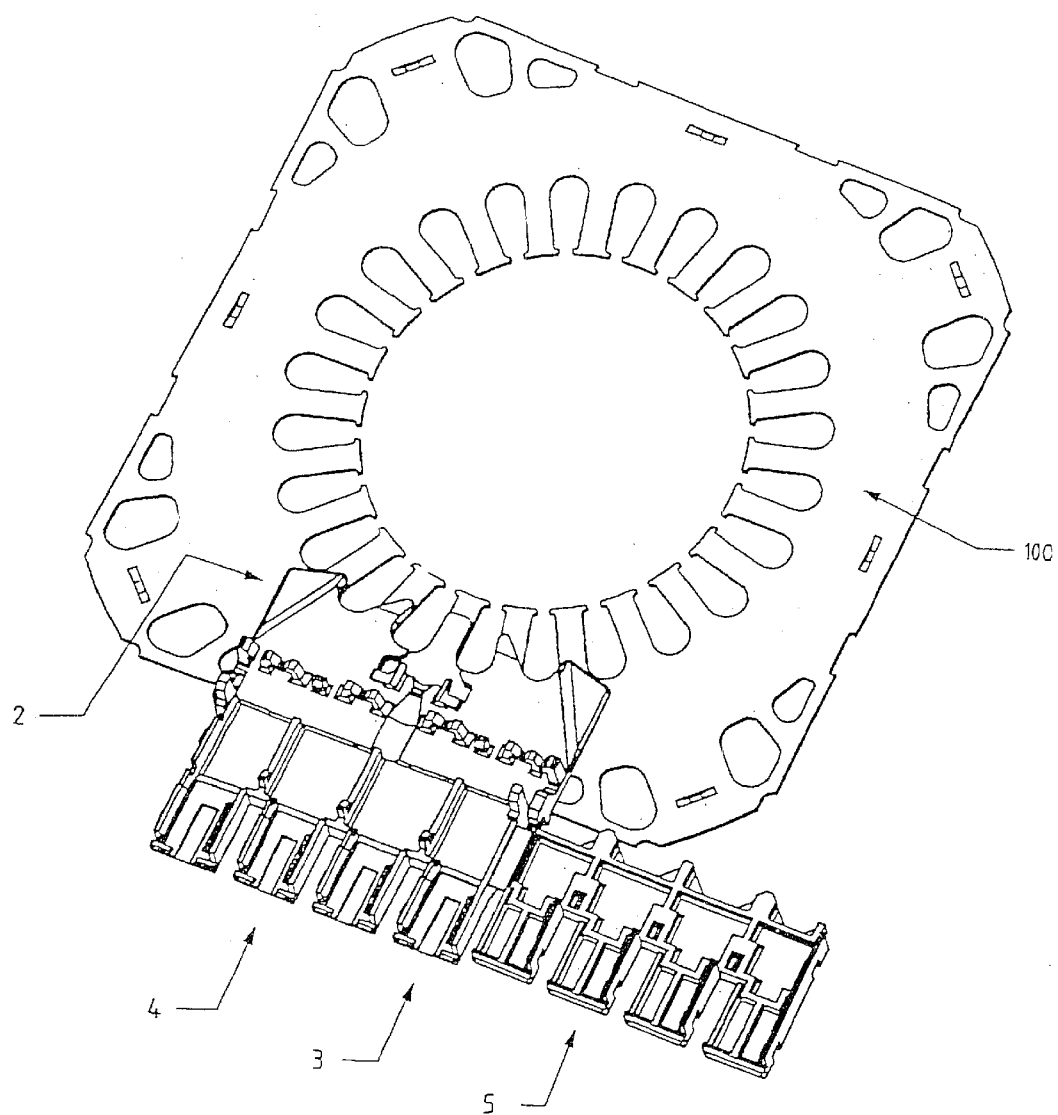
FIG. 8 shows in an oblique view the open receptacle mount which has been attached to the foot part and FIG. 9 shows the plug part in the position of use with a closed and swivelled receptacle mount.

In the following, using FIGS. 7 to 9, making contact with a stator winding using a plug part 1 as claimed in the invention is explained. For the sake of simpler representation the stator core of an electric motor is symbolized exclusively by a stator lamination 100 and the stator winding and slot insulations located in the slots 101 of the laminated stator core are not shown.

Figure 3:
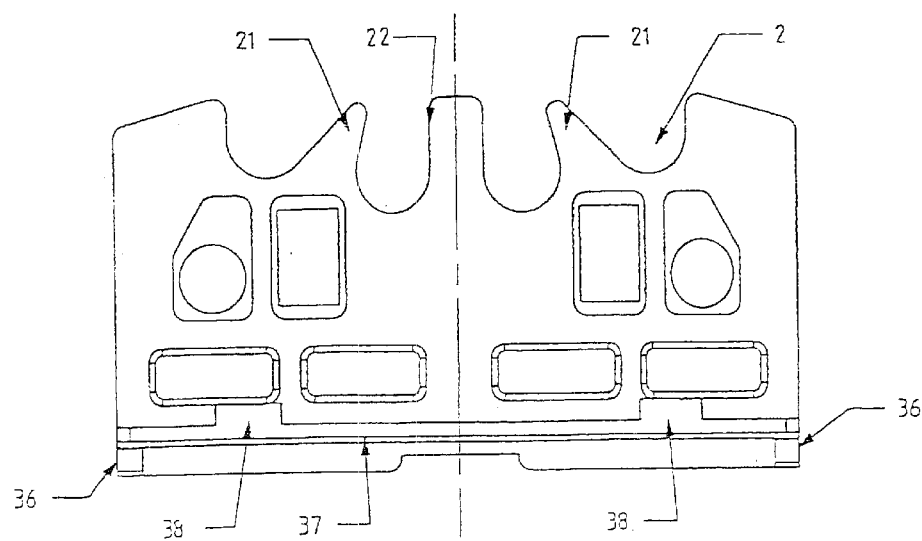
FIG. 3 shows a bottom view of the foot part from FIG. 1.

First, one foot part 2 of the plug part 1 as claimed in the invention is attached to the stator core 100 such that its projection 22 fits between two slot insulations and the two tines 21 adjoin the slot insulations between which the projection 22 is held, from the outside. The location of the foot part 2 of the plug part 1 as claimed in the invention on the laminated stator core 100 in the radial direction is ensured by the rib 37 with its projections 38 (FIG. 3). After the foot part 2 has been attached, the winding heads of the stator winding can be formed and sewn. In doing so the movements of the needles during sewing of the winding heads are not hindered due to the recesses 30 and 31 in the foot part 2.

As the next step the still open receptacle mount 3 of the plug part 1 as claimed in the invention is attached to the foot part 2 by the bead 49 with the bearing journal 60 being snapped into the bearing 27 (formed by the bearing half 35 and 36) on the foot part 2. Then the position as shown in FIG. 8 is reached.

In this position the wires to be contacted are cut to the corresponding length, provided with receptacles by crimping them on, the wires are pressed into the receiving spaces 26 between two hooks 24 on the foot part 2 at a time, and the receptacles are fixed in the receiving spaces 40, for example by pressing in from overhead.

After this has taken place, the top part 5 of the receptacle mount 3 is folded onto the bottom part 4 and is fixed on it by the catch projections 44, 46, 48 fitting into the catch projections 50, 53, 54 in the closed position.

As the last step, the closed receptacle mount 3 is swivelled into the position which is shown in FIG. 9 until the catch hooks 29 fit into the catch recesses 56 via the catch tongues 61 and the catch hooks 28.

In summary, one embodiment of the invention can be described as follows.

One plug part 1 for making contact with the wires of the stator winding of an electric motor has a foot part 2 which can be fixed using tines 21 and a projection 22 to two adjacent slot insulations. The plug part 1 furthermore has a receptacle mount 3 which is a part which is separate from the foot part 2 and which can be detachably fixed with a swivelling capacity to the foot part 2. The receptacle mount 3 consists of a bottom part 4 with receivers 40 for the receptacles and of a top part 5 which can be folded for closing the receivers 40 for the receptacles onto the bottom part 4 of the receptacle mount 3 and can be fixed by locking.

The foot part 2 of the plug part 1 can first of all be attached without the receptacle mount 3 to a stator before the winding heads are formed and sewn. Only then is the receptacle mount 3 attached to the foot part 2. The receptacles are crimped directly onto the enamelled wires of the stator windings and are fitted into the receivers 40 in the receptacle mount 3.

What is claimed is:

1. Plug part (1) for making contact with wires of stator windings of an electric motor, the plug part (1) having a foot part (2) which can be fixed on adjacent slot insulations using projecting tines (21) and a projection (22), and contacts to which the wires of the stator windings are connected, wherein the plug part (1) has a receptacle mount (3) which is separated from the foot part (2) and which can be detachably fixed to the foot part (2) which can be fixed on a stator using the projecting tines (21) and the projection (22), wherein the receptacle mount (3) has a bottom part (4) with receivers (40) for receptacles and a top part (5) which can be fixed on the bottom part (4) of the receptacle mount (3) for closing the receivers (40) for the receptacles, wherein the receptacle mount (3) can be swivelled relative to the foot part (2) around a swivel axis which in an area of an edge of the foot part (2) opposite the tines (21) and the projection (22) lies in an area of an edge of the receptacle mount (3) which is opposite the receivers (40) for the receptacles.

2. Plug part as claimed in claim 1, wherein a base plate (20) of the foot part (2) has recesses (30, 31) which form open spaces for needles for sewing winding heads of the stator windings.

3. Plug part as claimed in claim 1, wherein on the foot part (2) there are bearings (27) for bearing journals (60) which are formed on the receptacle mount (3) and which project over side walls of the receptacle mount (3).

4. Plug part as claimed in claim 3, wherein on the bottom part (4) of the receptacle mount (3) there is a bead (49) which passes over an entire length of the bottom part (4) of the receptacle mount (3) and which is located equiaxially to the bearing journals (60), with a cross section which is equal to a cross section of the bearing journals (60) which project over the side walls of the receptacle mount (3).

5. Plug part as claimed in claim 3, wherein the bearings (27) on the foot part (2) are formed by two bearing halves (35, 36) which adjoin the bearing journals (60).

6. Plug part as claimed in claim 1, wherein on the foot part (2) there are catch hooks (28) which fit into catch recesses (56) in the receptacle mount (3) when the receptacle mount is rotated to include an angle of 90° with the foot part (2).

7. Plug part as claimed in claim 6, wherein there are catch recesses (56) in the top part (5) of the receptacle mount (3).

8. Plug part as claimed in claim 2, wherein from the base plate (20) of the foot part (2) several pairs (23) of hooks, each consisting of two hooks (24), project, between the hooks (24) there being receiving spaces (26) for the wires of the stator windings.

9. Plug part as claimed in claim 8, wherein free ends (25) of the hooks (24) have a distance from one another which is smaller than a diameter of the wires.

10. Plug part as claimed in claim 2, wherein in the base plate (20) of the foot part (2) a recess (32) is relieved and on its edge there are two hold-down tongues (33) which extend parallel to the base plate (20) of the foot part (2).

11. Plug part as claimed in claim 1, wherein the receivers (40) for the receptacles in the bottom part (4) of the receptacle mount (3) are bordered laterally by two walls (42, 43).

12. Plug part as claimed in claim 1, wherein between adjacent ones of the receivers (40) there are walls (45) which project upward from a base plate (41) of the bottom part (4) of the receptacle mount (3).

13. Plug part as claimed in claim 1, wherein the receivers (40) for receptacles in the bottom part (4) of the receptacle mount (3) are bordered by ribs (70) on a side which is opposite the swivel axis of the receptacle mount (3).

14. Plug part as claimed in claim 11, wherein on top ends of the two walls (42, 43) of each receiver (40) for the receptacle there are hold-down ribs (73).

15. Plug part as claimed in claim 14, wherein the hold-down ribs (73) are bevelled on their top side.

16. Plug part as claimed in claim 12, wherein on the walls (45) which project upward from the base plate (41) of the bottom part (4) of the receptacle mount (3) there are catch hooks (46) to which catch recesses (53) in a cover plate (51) of the top part (5) are assigned.

17. Plug part as claimed in claim 11, wherein on one (42) of the two walls (42, 43) of the receivers (40) for receptacles there is a catch projection (44) to which catch recesses (50) in walls (52) projecting from a cover plate (51) of the top part (5) are assigned.

18. Plug part as claimed in claim 1, wherein from a lower side of the bottom part (4) of the receptacle mount (3) a projection (65) projects which is supported on one component of the electric motor in an axial direction.

19. Plug part as claimed in claim 2, wherein from a side of the base plate (20) of the foot part (2), a rib (37) projects which adjoins a laminated stator core (100) of the electric motor.

20. Plug part as claimed in claim 19, wherein on the rib (37) there are projections (38) which point towards the tines (21).

* * * * *